United States Patent
Hampton et al.

(10) Patent No.: US 11,113,454 B2
(45) Date of Patent: Sep. 7, 2021

(54) IN-LINE EDITING OF WEBPAGES

(71) Applicant: International Business Machines Corporation, Armonk, NY (US)

(72) Inventors: Mark C. Hampton, Carlton (AU); William J. Izard, Sydney (AU); Elias K. Jordan, Marrickville (AU); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 14/069,620

(22) Filed: Nov. 1, 2013

(65) Prior Publication Data
US 2014/0195892 A1    Jul. 10, 2014

Related U.S. Application Data

(63) Continuation of application No. 13/735,380, filed on Jan. 7, 2013.

(51) Int. Cl.
*G06F 40/143*    (2020.01)
*G06F 40/166*    (2020.01)
*G06F 16/958*    (2019.01)

(52) U.S. Cl.
CPC .......... *G06F 40/143* (2020.01); *G06F 16/958* (2019.01); *G06F 40/166* (2020.01)

(58) Field of Classification Search
CPC ... G06F 17/24; G06F 17/2247; G06F 17/3089
See application file for complete search history.

(56) References Cited

U.S. PATENT DOCUMENTS

| | | | |
|---|---|---|---|
| 7,287,227 B2 | 10/2007 | Ries et al. | |
| 8,234,562 B1* | 7/2012 | Evans | G06F 17/243 715/221 |
| 2003/0023632 A1* | 1/2003 | Ries | G06F 17/3089 715/235 |
| 2003/0093497 A1* | 5/2003 | Ohashi | G06F 40/103 709/217 |

(Continued)

FOREIGN PATENT DOCUMENTS

| | | |
|---|---|---|
| JP | 2007149016 A | 6/2007 |
| WO | 2010093063 A1 | 8/2010 |
| WO | 2014106785 A1 | 7/2014 |

OTHER PUBLICATIONS

Madhusudan Pagadala, "Partial Page Rendering Using Hidden Iframe", www.htmlgoodies.com, Apr. 8, 2008, pp. 1-14. (Year: 2008).*

(Continued)

*Primary Examiner* — Ariel Mercado
(74) *Attorney, Agent, or Firm* — Reza Sarbakhsh (57) ABSTRACT

A method, computer program product, and system for editing webpages is described. An editable region of a dynamically rendered webpage is identified. An indicator associated with the editable region is provided, wherein the indicator identifies the editable region as available for editing. An in-line edit, made by a user, to a portion of the editable region is identified. Commitment of the in-line edit for rendering is identified. A first portion of the webpage is rendered based upon, at least in part, the commitment of the in-line edit for rendering, wherein the first portion of the webpage is affected by the in-line edit and one or more portions of the webpage that are not affected by the in-line edit are not rendered concurrently with the first portion of the webpage.

7 Claims, 5 Drawing Sheets

(56) References Cited

U.S. PATENT DOCUMENTS

| | | | |
|---|---|---|---|
| 2004/0193661 A1* | 9/2004 | Sikchi | G06F 17/30569 |
| 2004/0268246 A1* | 12/2004 | Leban | G06F 17/2247 |
| | | | 715/239 |
| 2007/0055755 A1* | 3/2007 | Sasnett | G06F 17/24 |
| | | | 709/223 |
| 2007/0113168 A1* | 5/2007 | de Souza | G06F 17/243 |
| | | | 715/210 |
| 2008/0178073 A1* | 7/2008 | Gao | G06F 17/24 |
| | | | 715/243 |
| 2008/0184102 A1* | 7/2008 | Selig | G06F 17/243 |
| | | | 715/234 |
| 2009/0282062 A1 | 11/2009 | Husic | |
| 2012/0072821 A1 | 3/2012 | Bowling | |
| 2012/0151329 A1 | 6/2012 | Cordasco | |
| 2012/0159430 A1* | 6/2012 | Waldbaum | G06F 9/454 |
| | | | 717/106 |
| 2014/0129924 A1 | 5/2014 | Le Bescond de Coatpont | |
| 2014/0164994 A1 | 6/2014 | Myslinski | |
| 2014/0195889 A1 | 7/2014 | Hampton | |
| 2014/0304682 A1* | 10/2014 | Taylor | G06F 9/45529 |
| | | | 717/113 |

OTHER PUBLICATIONS

Refresh, http://computerhope.com/jargon/r/refresh.htm, Oct. 13, 2006, p. 1. (Year: 2006).*

International Search Report and Written Opinion dated Apr. 28, 2014 Received in International Application No. PCT/IB2013/060980, pp. 1-6.

* cited by examiner

IN-LINE EDITING OF WEBPAGES

RELATED APPLICATIONS

The subject application is a continuation application of U.S. Patent Application with Ser. No. 13/735,380, filed on Jan. 7, 2013, the entire content of which is herein incorporated by reference.

TECHNICAL FIELD

This disclosure relates to editing webpages.

BACKGROUND

Certain webpages may be dynamically rendered webpages. In contrast, for example, to static webpages, which may be represented by a single webpage file (e.g., an HTML file), a dynamically rendered (i.e., "dynamic") webpage may be based upon multiple underlying files. For example, a dynamic webpage may be based upon one or more files specifying the architecture of the webpage along with various content-related files that are referenced by links or otherwise within (and/or with regard to) the architecture file(s). As such, for example, a dynamic webpage may need to be rendered (i.e., assembled from various architecture, content and/or other files and references) in order to be displayed in its intended form/format. For example, a dynamically rendered webpage may be rendered for display based upon accessing separately stored architecture and content files and merging aspects of these files to inform the display of the rendered webpage. Individuals may find it useful to modify webpages, including dynamically rendered webpages, in various ways.

BRIEF SUMMARY OF THE DISCLOSURE

According to one aspect of the disclosure, a computer-implemented method includes identifying, by one or more computing devices, an editable region of a dynamically rendered webpage. The method includes providing, by the one or more computing devices, an indicator associated with the editable region, wherein the indicator identifies the editable region as available for editing. The method includes identifying, by the one or more computing devices, an in-line edit, made by a user, to a portion of the editable region. The method includes identifying, by the one or more computing devices, commitment of the in-line edit for rendering. The method includes rendering, by the one or more computing devices, a first portion of the webpage based upon, at least in part, the commitment of the in-line edit for rendering, wherein the first portion of the webpage is affected by the in-line edit and one or more portions of the webpage that are not affected by the in-line edit are not rendered concurrently with the first portion of the webpage.

One or more of the following features may be included. The method may include identifying a listening region of the dynamically rendered webpage, wherein the listening region is dependent on the editable region and is associated with a second portion of the webpage. The method may include rendering the second portion of the webpage based upon, at least in part, the commitment of the in-line edit for rendering. Identifying the editable region may be based upon, at least in part, identifying non-comment tags associated with the editable region. Providing the indicator associated with the editable region may be based upon, at least in part, the user viewing the webpage in an editing mode. The indicator associated with the editable region may include one or more of a field label, help text, and a control for editing a field included within the editable region. The in-line edit may include creation of new content associated with the editable region. The in-line edit may include an edit to existing content associated with the editable region. The method may include creating an edited content draft including the new content. The method may include enabling in-line editing with respect to the edited content draft. The method may include rendering a second portion of the webpage based upon, at least in part, a portion of the edited content draft and identifying the commitment of the in-line edit for rendering. The method may include identifying a field that has been modified as part of the identified in-line edit. The method may include, prior to rendering the first portion of the webpage, identifying an error associated with the modified field. The method may include providing an indication of the identified error to the user.

According to another aspect of the disclosure, a computer program product resides on a computer readable storage medium that has a plurality of instructions stored on it. When executed by a processor, the instructions cause a processor to perform operations including identifying an editable region of a dynamically rendered webpage. The operations include providing an indicator associated with the editable region, wherein the indicator identifies the editable region as available for editing. The operations include identifying an in-line edit, made by a user, to a portion of the editable region. The operations include identifying commitment of the in-line edit for rendering. The operations include rendering a first portion of the webpage based upon, at least in part, the commitment of the in-line edit for rendering, wherein the first portion of the webpage is affected by the in-line edit and one or more portions of the webpage that are not affected by the in-line edit are not rendered concurrently with the first portion of the webpage.

One or more of the following features may be included. The operations may include identifying a listening region of the dynamically rendered webpage, wherein the listening region is dependent on the editable region and is associated with a second portion of the webpage. The operations may include rendering the second portion of the webpage based upon, at least in part, the commitment of the in-line edit for rendering. Identifying the editable region may be based upon, at least in part, identifying non-comment tags associated with the editable region. Providing the indicator associated with the editable region may be based upon, at least in part, the user viewing the webpage in an editing mode. The indicator associated with the editable region may include one or more of a field label, help text, and a control for editing a field included within the editable region. The in-line edit may include creation of new content associated with the editable region. The in-line edit may include an edit to existing content associated with the editable region. The operations may include creating an edited content draft including the new content. The operations may include enabling in-line editing with respect to the edited content draft. The operations may include rendering a second portion of the webpage based upon, at least in part, a portion of the edited content draft and identifying the commitment of the in-line edit for rendering. The operations may include identifying a field that has been modified as part of the identified in-line edit. The operations may include, prior to rendering the first portion of the webpage, identifying an error associated with the modified field. The operations may include providing an indication of the identified error to the user.

According to another aspect of the disclosure, a computing system includes one or more processor devices and one or more memory architectures coupled with the one or more processor devices. The one or more processor devices are configured to identify an editable region of a dynamically rendered webpage. The one or more processor devices are configured to provide an indicator associated with the editable region, wherein the indicator identifies the editable region as available for editing. The one or more processor devices are configured to identify an in-line edit, made by a user, to a portion of the editable region. The one or more processor devices are configured to identify commitment of the in-line edit for rendering. The one or more processor devices are configured to render a first portion of the webpage based upon, at least in part, the commitment of the in-line edit for rendering, wherein the first portion of the webpage is affected by the in-line edit and one or more portions of the webpage that are not affected by the in-line edit are not rendered concurrently with the first portion of the webpage.

One or more of the following features may be included. The one or more processor devices may be configured to identify a listening region of the dynamically rendered webpage, wherein the listening region is dependent on the editable region and is associated with a second portion of the webpage. The one or more processor devices may be configured to render the second portion of the webpage based upon, at least in part, the commitment of the in-line edit for rendering. Identifying the editable region may be based upon, at least in part, identifying non-comment tags associated with the editable region. Providing the indicator associated with the editable region may be based upon, at least in part, the user viewing the webpage in an editing mode. The indicator associated with the editable region may include one or more of a field label, help text, and a control for editing a field included within the editable region. The in-line edit may include creation of new content associated with the editable region. The in-line edit may include an edit to existing content associated with the editable region. The one or more processor devices may be configured to create an edited content draft including the new content. The one or more processor devices may be configured to enable in-line editing with respect to the edited content draft. The one or more processor devices may be configured to render a second portion of the webpage based upon, at least in part, a portion of the edited content draft and identifying the commitment of the in-line edit for rendering. The one or more processor devices may be configured to identify a field that has been modified as part of the identified in-line edit. The one or more processor devices may be configured to, prior to rendering the first portion of the webpage, identify an error associated with the modified field. The one or more processor devices may be configured to provide an indication of the identified error to the user.

According to one aspect of the disclosure, a computer-implemented method includes identifying, by one or more computing devices, an editable region of a dynamically rendered webpage. The method includes providing, by the one or more computing devices, an indicator associated with the editable region, wherein the indicator identifies the editable region as available for editing. The method includes identifying, by the one or more computing devices, an in-line edit, made by a user, to a portion of the editable region. The method includes creating, by the one or more computing devices, an edited content draft including the in-line edit. The method includes identifying, by the one or more computing devices, commitment of the in-line edit for rendering. The method includes rendering, by the one or more computing devices, a first portion of the webpage associated with a portion of the edited content draft, based upon, at least in part, identifying the commitment of the in-line edit for rendering, wherein the first portion of the webpage is affected by the in-line edit and one or more portions of the webpage that are not affected by the in-line edit are not rendered concurrently with the first portion of the webpage. The method includes identifying, by the one or more computing devices, a listening region of the dynamically rendered webpage, wherein the listening region is associated with a second portion of the webpage and is dependent on the editable region. The method includes rendering, by the one or more computing devices, the second portion of the webpage based upon, at least in part, the commitment of the in-line edit for rendering.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In certain instances, certain webpages may be dynamically rendered (i.e., may be "dynamic" webpages). A webpage may be considered as dynamically rendered, for example, in the case that server processes are utilized to alter, create, and/or aggregate data from various sources into at least a portion of a visible webpage. For example, webpage creators may create a webpage architecture (e.g., webpage templates, layout, and so on), which may be supplemented with various content such as text, images, links, and so on. In certain embodiments, for example, at least a portion of this content may be stored separately from aspects of the webpage architecture, resulting in the need to dynamically combine architecture and content into a visible (i.e., rendered) webpage. Certain webpages may be based upon structured and/or unstructured content that is stored in a web content management system ("CMS") and/or other systems. Such content, in certain instances, may be rendered and merged with presentation artifacts in order to display the relevant webpages to various users.

In certain embodiments, it may be desirable to facilitate content authors editing content in a dynamically rendered web page without leaving the context of the page and/or without editing the entirety of the page—i.e., to edit particular content in an "in-line" manner within a representation of a full (or partial) rendering of the full (or partial) webpage containing the content. In certain embodiments, for example, this functionality may permit users to see useful representations of a webpage as they are editing it, which may facilitate users perceiving a closer interaction between themselves and the webpage. In certain embodiments, it may therefore be desirable to facilitate users interacting with both visible and non-visible content (with respect to the rendered webpage) and modifying source content in addition/as an alternative to the rendered webpage output.

In certain instances, however, various manipulation of content may occur during dynamic rendering, which may introduce various issues with respect to in-line editing. For example, links or other references to re-usable components may be de-referenced, which may result in the loss, with respect to the rendered webpage, of the original "soft" representation of the links/references. In certain instances, data may be encoded as part of the dynamic rendering. For example, Uniform Resource Locator ("URL"), Hypertext Mark-up Language ("HTML"), JavaScript Object Notation ("JSON") and/or various other encoding may be applied to data as part of webpage rendering. Similarly, in certain instances, textual content may be truncated, abstracted, and so on, in order to present, as part of the rendered webpage, a summarized or otherwise shortened version of text. In certain embodiments, various fields (including, for example, data drawn from diverse sources) may be merged together. For example, date ranges, user details, media data and so on may be merged through rendering into a single markup structure.

Additionally, in certain instances various data associated with a dynamically rendered webpage may not be visible on the rendered webpage. For example, certain types data— e.g., workflow, security, and categorization data, metadata, and so on—may generally not appear on a rendered webpage. Further, certain data may be visibly rendered only in specific instances and/or contexts. For example, various text and/or image data that may be designed for rendering content as lists or indexes and, as such, this text and/or image data may not appear in the same place as the full text of the content. Similarly, in certain instances, content may be rendered into hidden markups or scripts. For example, certain content may be rendered into a markup without any visible representation, into markup attributes, or as data that may be passed into webpage scripts.

These and other complicated relationships between rendered appearance and underlying webpage content and other data may inhibit facilitating useful and seamless in-line editing solutions. In certain embodiments, an in-line webpage editing ("IWE") process (or application) may address these and other issues.

Figure 1:
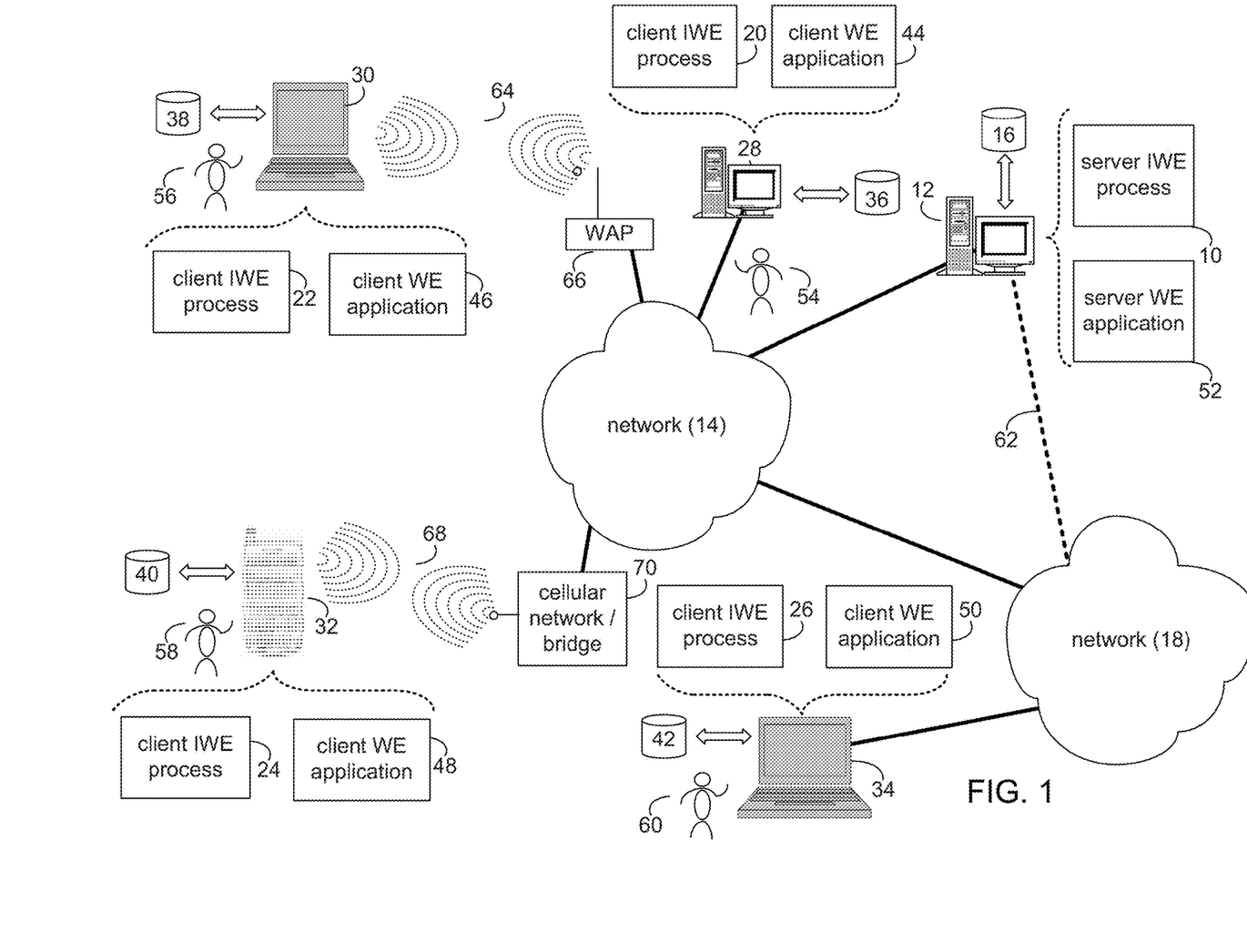
FIG. 1 is a diagrammatic view of an in-line website editing process coupled to a distributed computing network.

Referring now to FIG. 1, an IWE process may be coupled to a computer or computer network. For example, server IWE process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server IWE process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client IWE processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client IWE processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the IWE process may be a server-side process (e.g., which may be implemented via server IWE process 10), in which all of the functionality of the IWE process may be executed on a server computer (e.g., server computer 12). In an embodiment, the IWE process may be a client-side process (e.g., which may be implemented via one or more of client IWE processes 20, 22, 24, 26), in which all of the functionality of the IWE process may be executed on a client computing device (e.g., one or more of client electronic devices 28, 30, 32, 34). In an embodiment, the IWE process may be a hybrid server-client process (e.g., which may be implemented by server IWE process 10 and one or more of client IWE processes 20, 22, 24, 26), in which at least a portion of the functionality of the IWE process may be implemented via server computer 12 and at least a portion of the functionality of the IWE process may be implemented via one or more client computing devices (e.g., one or more of client electronic devices 28, 30, 32, 34).

In certain embodiments, an IWE process may be a stand-alone process. In certain embodiments, an IWE process may operate as part of, or in conjunction with, one or more other processes and/or may include one or more other processes. For example, in certain embodiments, an IWE process may be included in (or may operate in conjunction with) a general webpage editing ("WE") application (or process), which may generally facilitate editing one or more webpages. Additionally/alternatively, in certain embodiments, an IWE process (and/or a WE application (or process)) may be included in (or may operate in conjunction with) a webpage rendering application or process (not shown), a content management system (not shown), and/or various other applications (or processes) for managing various aspects of webpage architecture and/or content.

A WE application (or process) may operate (and/or reside) on a client device (e.g., client WE application 44, operating on client electronic device 28; client application WE 46, operating on client electronic device 30; client WE application 48, operating on client electronic device 32; or client WE application 50, operating on client electronic device 34). A client IWE process (e.g., client IWE process 20) or a server IWE process (e.g., server IWE process 10) may be in communication with a client WE application (e.g., client WE application 44) or may be part of a client WE application.

A WE application may additionally/alternatively operate (and/or reside) on a server device (e.g., server WE application 52, operating on server computer 12 or another server WE application (not shown), operating on another server computer (not shown)). A server IWE process (e.g., server IWE process 10) or a client IWE process (e.g., client IWE process 20) may be in communication with a server WE application (e.g., server WE application 52) or may be a part of a server WE application.

A webpage rendering application (or process), content management system, and/or various other applications (or processes) for managing aspects of webpage architecture and/or content may operate (and/or reside) on a client device (not shown). A client IWE process (e.g., client IWE process 20) or a server IWE process (e.g., server IWE process 10) may be in communication with such client systems and/or applications (or processes) (not shown) and/or may be part of such client systems and/or applications (or processes) (not shown).

A webpage rendering application (or process), content management system, and/or various other applications (or processes) for managing aspects of webpage architecture and/or content may additionally/alternatively operate (and/or reside) on a server device (not shown). A server IWE process (e.g., server IWE process 10) or a client IWE process (e.g., client IWE process 20) may be in communication with such server systems and/or applications (or processes) (not shown) and/or may be a part of such server systems and/or applications (or processes) (not shown).

Users 54, 56, 58, 60 may access an IWE process in various ways. For example, these users may access server IWE process 10 directly through the device on which a client process (e.g., client IWE processes 20, 22, 24, 26) is executed, namely client electronic devices 28, 30, 32, 34. Users 54, 56, 58, 60 may access server IWE process 10 directly through network 14 and/or through secondary network 18. Further, server computer 12 (i.e., the computer that executes server IWE process 10) may be connected to network 14 through secondary network 18, as illustrated with phantom link line 62. Users 54, 56, 58, 60 may also access a client or server WE application (or process) and/or a client or server webpage rendering and/or content management system (or application or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client IWE process 20 will be described for illustrative purposes. It will be understood that client IWE process 20 may, for example, interact and/or communicate with a server IWE process such as server IWE process 10 and/or may be executed within one or more applications that allow for communication with other server and/or client IWE processes. This is not intended to be a limitation of this disclosure, as other configurations are possible (e.g., IWE process 20 may include stand-alone client processes and/or stand-alone server processes). For example, some implementations may include one or more of client IWE processes 22, 24, 26 or server IWE process 10 in place of or in addition to client IWE process 20.

Figure 2:
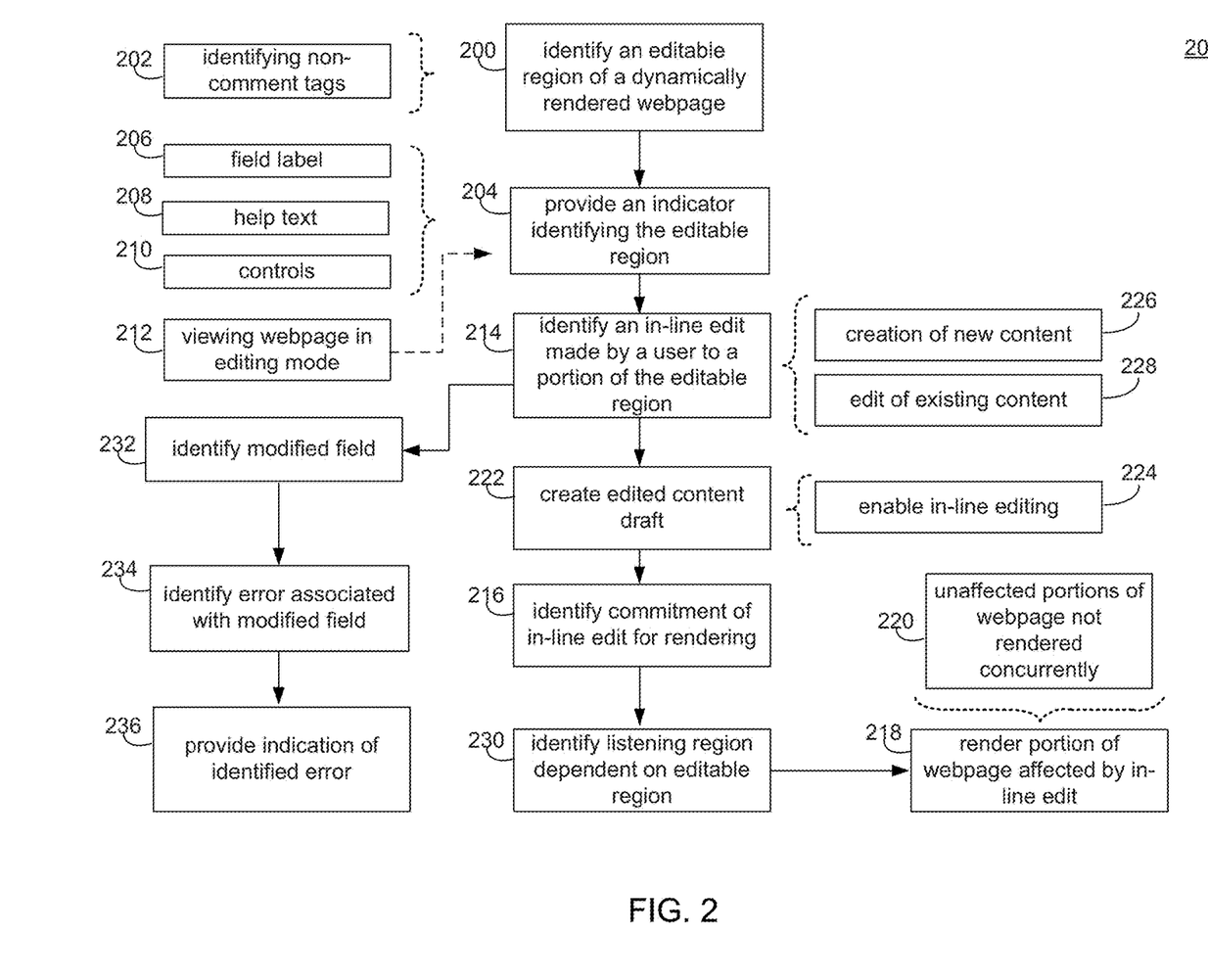
FIG. 2 is a flowchart of a process executed by the in-line website editing process of FIG. 1.

Referring now also to FIG. 2, there is shown a diagrammatic view of an example process that may be implemented by an IWE process, e.g., client IWE process 20. Client IWE process 20 may identify 200 an editable region of a dynamically rendered webpage. An editable region may represent a portion of the dynamically rendered webpage—e.g., a particular item of content included on the page. It will be understood that "content" may include a collection of fields and/or other information associated with a web page, such as an event (e.g., which may include title information, time information, location information, description information, and the like). It will further be understood that there may be multiple content items associated with a single webpage. As such, when designating a field as editable a developer may also designate on which portion of content that field may reside. In certain embodiments, this (and/or other) information may be identified by IWE process 20 as part of identifying 200 an editable region.

In certain embodiments, an editable region may be as large or small as may be appropriate to capture the visual (and/or other) representation of certain content. As also noted above, an editable region may be created (and/or designated) by a webpage designer (and/or other user). For example, a designer may employ tags or other markups to designate an editable region. In certain embodiments, tags may specify which fields are included in an editable region. This may in turn, for example, facilitate determining what source content may be loaded into various in-line editing controls. In certain embodiments, for example, a developer may specify <DIV> or <SPAN> tags to represent "block" and "inline" fields respectively as editable. IWE process 20 may analyze such tags (and/or other information) as part of identifying 200 an editable region of a webpage.

Tags used to designate an editable region may take a variety of forms. For example, in certain embodiments, a webpage designer may provide the following:

<EditableField content="myContent"field=
      "myField"interaction-"popup"format="div">

<Field content="myContent"field=
      "myField"/></EditableField>

In this example, <EditableField> may be a server-side tag, which may indicate to a content management (and/or other) system that the portion of the webpage enclosed between the <EditableField> and </EditableField> tags (which may be "open" and "close" tags, respectively) may be a portion of the webpage that is editable by a user. As such, in this example, based on the use of the <EditableField> and </EditableField> tags, the field "myField" on the content "myContent" may be determined to be editable. Continuing this example, the inclusion of "div" may refer to a "block" field and the use of "popup" may indicate an interaction type. The <Field> tag may be a server-side tag which may indicate that the value of the field "myField" for the content "myContent" should be rendered to the page at this location. As a result, for example, based upon the above use of these tags, the field "myField" may be rendered on the website page, and may be available for in-line editing by a webpage user.

A developer (and/or other user) may also specify (using tags and/or other means) which type of editing interaction(s) may be associated with a particular editable region (or editable field thereof) when a webpage is in editing mode, as well as, for example, what type of content (and/or fields) may be visible (and/or hidden) when in a webpage is in edit (and/or normal mode). For example, certain fields may only be made visible during edit mode (or may remain hidden during edit mode). A developer may also, for example, designate what format should be rendered for the editable region, and so on.

In certain embodiments, IWE process 20 may identify 200 an editable region by parsing the webpage for appropriately marked regions. For example, IWE process 20 may parse the code underlying a webpage in order to identify tags (and/or other indicators) that designate various editable regions. In certain embodiments, IWE process 20 may identify 200 editable regions based upon identifying 202 non-comment tags associated with the editable region. For example, as also noted above, developers may user various tags—including markup tags that are not designated as comments—in order to indicate editable regions.

IWE process 20 may provide 204 an indicator associated with an editable region to a user accessing the webpage (e.g., an editor of the webpage), wherein the indicator identifies the editable region as available for editing. In certain embodiments, such an indicator may be provided 204 based upon whether a user is (or is not) accessing the webpage in edit mode. For example, IWE process 20 may provide 204 an indicator that particular regions of the webpage constitute editable regions only when a user views a webpage in edit mode. In certain embodiments, the provided 204 indicator may include a style or other visual characteristic applied to the region. For example, the indicator may be a different font or shading, a particular outline (e.g., a solid-line border around editable regions) and so on.

In certain embodiments, the provided 204 indicator may be a toolbar, which may display various information to the user. For example, such an indicator may include field label 206, help text 208, and/or various controls 210 (e.g., edit field, save changes, discard changes, and so on) for editing a field included within the editable region and/or other aspect of the editable region. In certain embodiments, such a toolbar indicator may vary depending on whether a region is being actively edited or not, what type of content and/or fields are associated with the region, and so on. For example in certain embodiments, action buttons representing commands to commit edits to be saved to a draft, to submit changes for publication, to discard changes, and so on, may not be visible when a user is not actively editing a particular field. IWE process 20 may further provide 204 as part of an indicator identifying editable regions (or otherwise provide, e.g., as part of a editing toolbar) various information, including the title of an editable region, the title of a field or an item of content being edited, and so on.

In certain embodiments, an indicator may be provided 204 based upon various user actions (and/or automatically). For example, as also noted above, in certain embodiments an indicator may be provided 204 based upon a user viewing 212 the webpage in an editing mode, based upon a user clicking on a particular editable region (and/or field), and so on. For example, a particular indicator (e.g., a toolbar) may be provided 204 only when a user is engaged with edit mode (i.e., may not visible when the user is simply viewing the webpage) or may be provided 204 only when a user clicks on an associated field or region.

A user may enter edit mode (i.e., may engage with a mode in which the user may edit editable regions of the webpage) in various ways. For example, a user may click on an editable region to enter edit mode, may select a particular icon or action button, and/or engage in various other actions to activate edit mode. In certain embodiments, if a particular user is not viewing a webpage in edit mode, in-line edit functionality may not be enabled for that user with respect to various content. This may, for example, permit users to switch between "preview" and "edit" modes (i.e., between simply viewing a webpage and being able to actively edit the webpage), and may prevent confusion when users are not actually engaged editing. It will be understood that, for various users, access to edit mode (and/or other functionality facilitated by IWE process 20) may be dependent on authentication processes and/or other authorization protocols.

IWE process 20 may identify 214 an in-line edit, made by a user, to a portion of an editable region. For example IWE process 20 may identify 214 that a user has edited (and/or is editing) a particular field, has added (and/or is adding) new content to an editable region, and so on. For example, IWE process 20 may identify 214 that a user has entered edit mode with respect to a particular webpage, has selected a particular content item, and has entered one or more edits to one or more fields contained within the content item. In certain embodiments, IWE process 20 may identify 214 in-line edits even though the changes have been entered outside the context of an editing "form" (i.e., a collection of all fields in a piece of content, which must be submitted in its entirety).

IWE process 20 may facilitate a user entering in-line edits and may identify 214 such edits in various ways. In certain embodiments, a user may enter edits through a pop-up dialog. For example, a user may be presented with a form for editing source content, with various functionality (e.g., save/cancel/exit buttons and so on), which may be launched, for example, when the user clicks on a editable region (and/or otherwise indicates an intent to edit the particular region).

In certain embodiments, IWE process 20 may facilitate in-place editing. For example, when a user enters edit mode, IWE process 20 may replace the normally viewable markup for an editable region with an editable version of the markup. In certain embodiments, the normally viewable markup may be replaced with an editable version as well as with various functionality (e.g., save/cancel/exit buttons, and so on provided as part of an editing toolbar). Such an embodiment, for example, may be particularly useful with regard to editable regions including text content.

In certain embodiments, IWE process 20 may facilitate overlay editing. For example, IWE process may overlay a view of editing controls onto various rendered content of an editable region in order to allow modifications to be made to the underlying content. For example, in the case where an editable field includes a date reference, IWE process 20 may provide an calendar with selectable dates as an overlay to the editable field, once a user has indicated an intent to edit that field (e.g., by clicking on the field while in edit mode). As such, for example, a user may select a date from the overlaid calendar to be input as an edit to the underlying field.

IWE process 20 may identify 216 commitment of the in-line edit (e.g., by the user), for rendering. A user may "commit" an edit of a particular field for rendering in various ways and at various times. For example, in certain embodiments, a user may commit an edit for rendering when the edit is complete (or at an appropriate partial stage of completion). In certain embodiments, a user may commit an edit of a particular field even though editing of the entire editable content (e.g., the entire editable region) may not yet be fully completed. For example, a user may automatically commit a field for editing by entering an in-line edit to the field then clicking a different portion of the webpage (e.g., a different field within the editable region) without otherwise discarding the edit. In certain embodiments, a user may additionally/alternatively commit an in-line edit for rendering by selecting a particular icon (e.g., a "commit edit for rendering" button provided in an editing toolbar).

It will be understood that "commitment" of an edit for rendering may vary from "submission" of an edit for publication. For example, once editing of a particular field, content, and so on is deemed complete (and/or otherwise ready for rendering), a user may "commit" the edit for rendering, which may result in IWE process 20 checking the particular edited field, content and so on for errors and/or rendering 218 a portion of the webpage representing, at least in part, the edited field, content, and so on. In contrast, when a user deems particular edits to various fields, content, and so on complete (and/or otherwise ready for publication) a user may "submit" one or more edits for publication, which may, for example, result in detailed validation of edits (i.e., more complete error checking) as well as rendering 218 of the edited region and/or other regions.

As discussed in greater detail below, it will be understood that in certain embodiments, the degree of rendering and/or error checking performed after committing an edit for rendering may vary from the degree of rendering and/or error checking performed after submitting an edit for publication. For example, a edited field forming part of certain webpage content may be committed for rendering even though edits to other fields in the content may not be complete (and, accordingly, the other fields may not be fully entered). As such, IWE process 20 may perform a limited error check on the committed field (i.e., because related fields/content may not have been filled in, committed for rendering and/or otherwise be made available) and may render the committed field in a limited way (i.e., because related fields/content may not have been filled in, committed for rendering and/or otherwise be made available). In certain embodiments, rendering and/or error checking of edits submitted for publication may be more complete (i.e., may involve review and/or other detailed analysis of each edited field as well as each related field/content, and so on).

As also noted above, a user may commit an edit for rendering (and, accordingly, IWE process 20 may identify 216 such commitment) in various ways. For example, in certain embodiments, IWE process 20 may identify 216 commitment of an edit based upon a user clicking away from a field that he has been editing (e.g., without clicking "cancel" on a provided toolbar). In certain embodiments, IWE process 20 may identify 216 commitment of an edit based upon a user clicking a "save," "commit," "error check" or other button (and/or taking another similar action) with respect to a particular in-line edit (or edits). Edits that are identified 216 as committed for rendering may be rendered 218 by IWE process 20 and may be displayed as rendered to the editing user. In this way, for example, IWE process 20 may facilitate a seamless editing process, in which changes to a field are committed for rendering and the rendered edits are promptly displayed as part of an updated view of the webpage.

In certain embodiments, each editable region may have a unique identifier (e.g., a serial number or other identifier). As such, when a particular edit is committed for rendering, the associated region identifier (as well as the rendering context and the edits to be rendered) may be sent to the content management service (or system) ("CMS"), along with a request for rendering of the updated editable region. The CMS may accordingly identify the appropriate content (i.e., based upon the unique identifier) and may provide the content to a rendering service (or other mechanism) to facilitate updating of the view of the edited region. (It will be understood that a similar process may be employed for submission of edits for publishing, with such submission being channeled, for example, through publishing workflow.)

In certain embodiments, IWE process 20 may render 218 edits that have been identified 216 as committed, but may not concurrently render 220 portions of the webpage that have not been affected by the identified in-line edit. As used herein, "not concurrently" means not simultaneously, not in close succession, not in response to the same input, and/or not in the same approximate time frame. For example, if only one portion of a webpage is rendered 218, other portions may be viewed as not being rendered concurrently with the rendered portion (even though they may, for example, have been previously rendered in order to provide the current display). Similarly, if a portion of a webpage is rendered 218 based on an identified 216 commitment of an in-line edit for rendering, and the entire website (or a different portion thereof) is subsequently rendered in response to a different action (e.g., a refreshing of the entire page), the first portion may be viewed as not having been rendered 220 concurrently with the entire website (or different portion thereof).

In this way, for example, a user may more directly perceive his editing as occurring in-line because only the edited region/field/content of a webpage may be rendered 218, rather than the entire webpage. This may additionally, for example, ensure more accurate rendering of edits, as raw webpage content may be processed by the rendering application/service in appropriate ways as part of rendering a particular edit. It will be understood, however, that in certain embodiments the targeted rendering of certain portions of a webpage (e.g., those containing committed edits) may not provide a wholly accurate view of the full webpage due to various complexities of rendering (as noted, for example, in discussion above). As such, for example, in certain embodiments the full submission of edits for publication may be necessary to facilitate a fully accurate rendering (and/or error checking) of the full dynamic webpage.

In certain embodiments committing an edit for rendering may cause IWE process 20 to create 222 (and/or save or otherwise update) a draft of the content being edited (i.e., an "edited content draft"). In certain embodiments, such a draft may be saved to a CMS associated with the dynamic rendering of the webpage (and/or another system). Creating 222 (and/or saving or otherwise updating) a draft may facilitate IWE process 20 tracking changes to a particular editable region and/or field without necessarily requiring submission of the region and/or field for full validation and/or full rendering of the webpage. Creating 222 (and/or saving or otherwise updating) a draft may also facilitate IWE process 20 providing "cancel," "undo" or other corrective functionality in order to discard various edits that a user may have committed for rendering (and/or submitted for publication, and so on).

In-line editing may be enabled 224 for various created (and/or saved or otherwise updated) 222 drafts. For example, for as long as a user is editing an editable region, his changes may be recorded in the created 222 draft (e.g., as saved through a CMS). As such, commitment of the in-line edit for rendering (and/or submission of the draft for publication) may prompt rendering 218 of a portion of the website based upon the draft. For example, once edits (e.g., edits to a particular field) have been committed for rendering (and/or submitted for publishing), a content management (and/or other) system may facilitate providing the appropriate draft (or appropriate portions thereof) to a rendering service in order to render the edited content. As also noted above, such created 222 drafts may accordingly be useful, for example, for facilitating preservation of pre-edit content/fields (i.e., though undo or discard functionality), error checking (e.g., through error checking of the content of the draft), and other aspects of webpage editing.

In certain embodiments, an identified 214 in-line edit may include creation 226 of new content. For example, such an identified 214 edit may include creation of a block on the webpage containing various fields, such as an event block containing images, dates, lists, and so on. In certain embodiments, such new content may be associated with an editable region. In certain embodiments, a user may indicate (e.g., though a control button or other functionality) the intent to create new content.

In response to a user creating new content (and/or indicating an intent to create new content), IWE process 20 may create 222 a draft update (i.e., an edited content draft) that may include the new content. In certain embodiments, for example, such a draft may be created 222 (and/or stored), for example, as part of (and/or through) a CMS. In certain embodiments, IWE process 20 may enable 224 in-line editing of the draft update of the new content.

As such, for example, IWE process may facilitate a user creating a draft of new content through a CMS, saving in-line edits to the draft, and rendering 218 various views of the new content based on the draft (as triggered, for example, by commitment of edits for rendering and/or communication of the draft to a rendering service). Such a draft may further, in certain embodiments, be used for final rendering upon submission of the edits for publication.

In certain embodiments, an identified 214 in-line edit may include an edit 228 to existing content (and/or associated fields). For example, an editable region with existing content may be selected for editing (e.g., through various control buttons) and/or the user may simply begin to enter in-line edits to existing content. In response, for example, to such selection and/or entry of edits, IWE process 20 may create 222 an edited content draft including the in-line edit to existing content. In certain embodiments, such a draft may be created 222 (and/or stored), for example, as part of (and/or through) a CMS. Similarly, in certain embodiments, IWE process 20 may enable 224 in-line editing of such a draft, may save in-line edits to the draft, and/or render 218 various views of the edited content based upon the draft (as triggered, for example, by commitment of edits for rendering and/or communication of the draft to a rendering service).

In certain embodiments, IWE process 20 may not create 222 an edited content draft based upon edits 228 to existing content (and/or edits including new content) until after receiving an indication that such edits have been committed for rendering (and/or otherwise finalized). For example, in certain embodiments IWE process 20 may not create 222 a draft based solely upon a user clicking on an editable region, but may instead create 222 a draft only after the user has actually made and/or committed one or more edits to the editable region.

In certain embodiments, IWE process 20 may determine that a draft relating to current in-line edits has previously been created 222 (e.g., as a result of earlier in-line edits to the same editable region). In such a case, for example, IWE process 20 may utilize the previously-created 222 draft to store the current in-line edits, rather than, for example, creating 222 an entirely new draft.

IWE process 20 may identify 230 a listening region dependent on the identified 200 editable region. A listening region may be associated with (e.g., may represent) a second portion of the webpage and may depend, in various aspects, on one or more fields (and/or other information) included within an editable region. (It will be understood that a listening region may also be an editable region, and vice versa.) In certain embodiments, certain regions of a webpage (i.e., "listening" regions) may not be available for direct in-line editing, but may derive various information presented within such regions from information included within an editable region. For example, a title field may be included in a particular editable region and may be repeated in various lists, breadcrumbs, and so on throughout the remainder of the webpage, even though these other regions may not themselves be editable regions. As such, in-line edits to portions of an editable region may affect the final rendering of a listening region, even though no edits were directly made to such listening region. Accordingly, it may be useful to identify 230 various listening regions that may be dependent on one or more editable regions (e.g., an editable region to which in-line edits are currently being made).

In certain embodiments, IWE process 20 may identify 230 a listening region based on identifying 214 an in-line edit and determining which (if any) other (i.e., "listening") regions may be dependent on the edited field. As such, continuing the example above, if an in-line edit is made to a title field, IWE process 20 may identify 230 as listening regions one or more of various other portions of the webpage (e.g., the various lists, breadcrumbs, and so on) that depend on the title field.

In certain embodiments, IWE process 20 may render 218 the portion of a webpage represented by the listening region. For example, in certain embodiments, IWE process may identify 214 an in-line edit and may then identify 230 various listening regions that depend on the field that has been edited. IWE process may further identify 216 commitment of the in-line edit for rendering and may, as a result, render 218 the portion of the webpage representing the edited field (and/or other portions of the webpage). IWE process 20 may additionally/alternatively, based upon, for example, commitment of the in-line edit for rendering, also render 218 one or more of the listening regions (i.e., other regions that are affected by the identified 214 in-line edit) in order to provide to the user a more accurate representation of the effects of his in-line edit.

In certain embodiments, the effect on various identified 230 listening regions of various identified 214 edits may also be reflected in created 222 drafts. As such, rendering 218 various listening regions may, in certain embodiments, be based upon various edited content drafts.

As also noted above, in certain embodiments IWE process 20 may facilitate various error checking, including, for example, intermediate error checking—i.e., error checking that occurs before the final validation required for publication of various edits. For example, IWE process 20 may identify 232 a field that has been modified as part of the identified 214 in-line edit (e.g., based upon identifying 214 an in-line edit and/or identifying 216 commitment of the in-line edit for rendering). IWE process may then (e.g., based upon identifying 216 commitment of the in-line edit for rendering) identify 234 an error associated with the modified field. For example, after a field has been committed for rendering, but before the field has been rendered, IWE process 20 may identify 234 an error associated with the field (as may, for example, result in incomplete (and/or failed) rendering of the field due to the error). IWE process 20 may, accordingly, provide 236 an indication of the identified error (e.g., as part of a view of the rendered field and/or otherwise). For example as part of (or in lieu of) rendering an in-line edit that has been committed for rendering, IWE process 20 may provide 236 an indication associated with the modified field that alerts the user that the edit to the field has introduced an error.

In this way, for example, IWE process 20 may facilitate checking fields for errors without necessarily submitting an entire form for full error checking or validation and/or otherwise submitting multiple fields for error checking. For example, as a user edits particular content within a webpage the user may commit certain fields for rendering (and/or intermediate error checking) before he has finished editing various other fields. Similarly, if a user is creating new content, he may desire to commit various of the new fields for rendering (and/or intermediate error checking) even though all fields within the new content may not be complete. As such, for example, it may be useful for IWE process 20 to selectively identify 234 errors associated only with fields that have been committed for rendering (e.g., as opposed to all the fields within an editable region) as well as, for example, related fields that have not been edited, have been previously checked for errors, and so on. In this way, for example, IWE process 20 may facilitate users editing content with multiple related (and/or unrelated) fields without necessarily generating error messages for the entire content after each (partial) edit is committed for rendering. In certain embodiments, when content is finally submitted for publication, IWE process 20 (and/or another process or application) may facilitate a full validation of the webpage (i.e., a complete error checking), with a created 222 draft of edited content being prevented from entering the publishing workflow until any identified errors are corrected.

Figure 3:
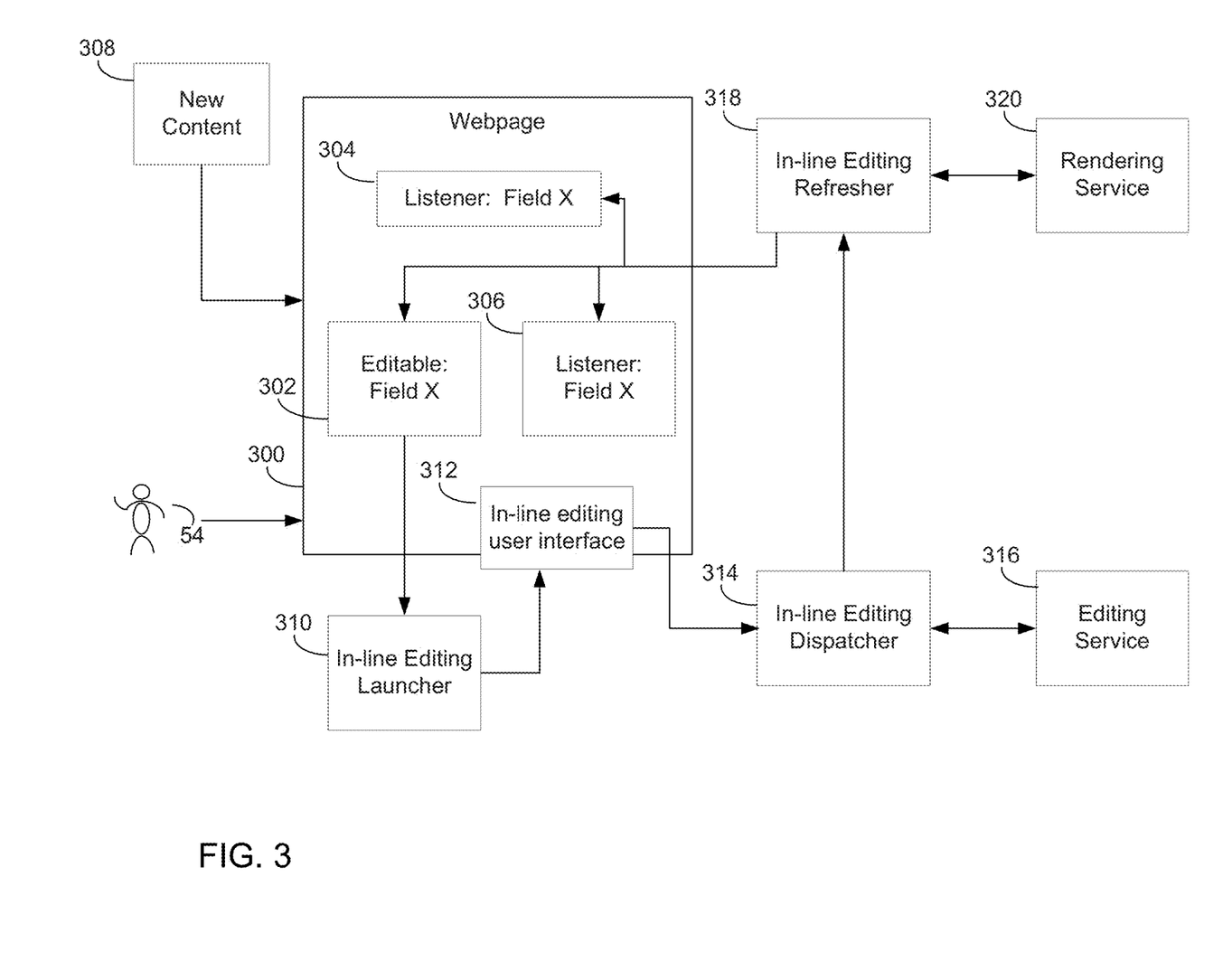
FIG. 3 is a diagrammatic view of an aspect of the in-line website editing process of FIG. 1.

Referring now also to FIG. 3, user 54 may be editing dynamically updated webpage 300, which may include Editable Region 302 (with editable Field X) and Listening Regions 304 and 306 (dependent on editable Field X of Editable Region 302). As part of editing webpage 300, user 54 may desire to create New Content 308 and/or may make various edits to Field X of Editable Region 302. As such, for example, user 54 may enter edit mode (if he is not already viewing the webpage in this mode), and may then click an action button associated with creating new content and/or editing existing content, and/or may click within an editable region (i.e., Editable Region 302). This may prompt, for example, IWE process 20 to activate (and/or otherwise call) In-Line Editor Launcher 310 which may facilitate user 54 being presented with In-Line Editing User Interface 312. Using Interface 312, user 54 may enter various edits (e.g., to New Content 308 or Editable Field 302) and may the commit such edits for rendering.

Once various edits have been verified for inclusion in an edited content draft (e.g., based upon user 54 clicking to a new field after making an edit to Field X, clicking "save" after making an edit to Field X, and so on), IWE process 20 may cause such edits to be transmitted to In-Line Editing Dispatcher 314, which may manage transmission of such edits to and/or processing of such edits by Editing Service 316 and/or In-Line Editing Refresher 318. For example, in certain embodiments, In-line Editing Dispatcher 314 may pass the various edits to Editing Service 316 for inclusion in a created 222 draft. Once the edits have been committed for rendering, the created 222 draft may then pass from Editing Service 316, via In-Line Editing Dispatcher 314, to In-Line Editing Refresher 318. In-Line Editing Refresher 318 may accordingly facilitate communication of the draft to and/or the processing of the draft by Rendering Service 320, which may respectively facilitate execution of the various steps of rendering the editable region represented by the created 222 draft (i.e., Editable Region 302) and/or various associated listening regions (i.e., Listening Regions 304 and 306).

It will be understood that, in the example above, In-line Editing Launcher 310, In-line Editing User Interface 312, In-line Editing Dispatcher 314, Editing Service 316, In-line Editing Refresher 318 and/or Rendering Service 320 may be part of IWE process 20 or vice versa, and/or may represent separate applications/modules/functionality with which IWE process 20 may interact and/or otherwise interoperate.)

Figure 4:
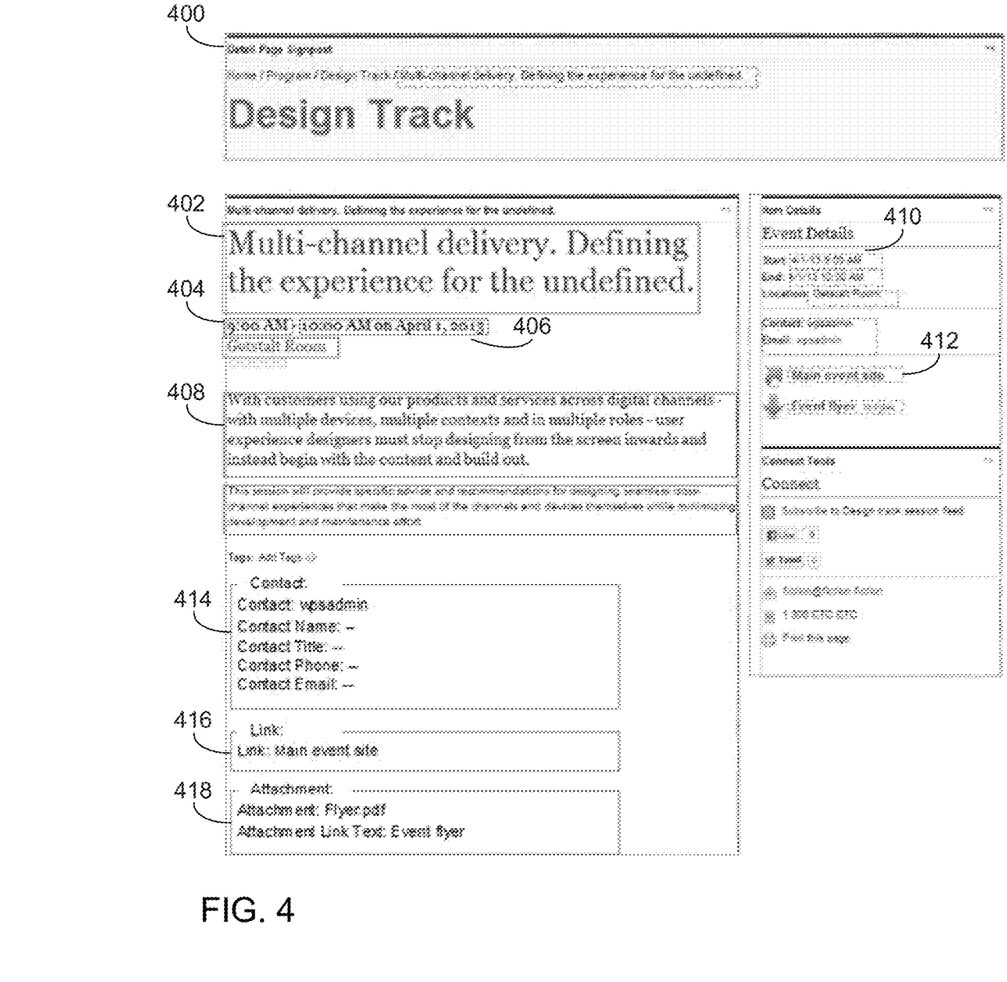
FIG. 4 is a diagrammatic view of an aspect of the in-line website editing process of FIG. 1.

Referring now also to FIG. 4, dynamically rendered webpage 400 may include various editable regions (e.g., regions 402, 404, 406, 408) and various listening regions (e.g., regions 410 and 412). IWE process 20 may, for example, provide 204 an indicator of editable regions in the form of solid outlines (e.g., around regions 402, 404, 406 and 408) and of listening regions in the form of a dotted outline (e.g., around regions 410 and 412). In certain embodiments, such indicators may be provided 204 only when the webpage is in edit mode (as depicted). In certain embodiments, fields that may be normally hidden (i.e., fields 414, 416 and 418) may be made viewable by IWE process 20 when the webpage is in edit mode. In certain embodiments, in order to enter various in-line edits, a user may, for example, click within the boundaries of an indicated editable region (e.g., region 402, 404, 406 or 408) or otherwise select a particular region (and/or content or field) for editing.

Figure 5:
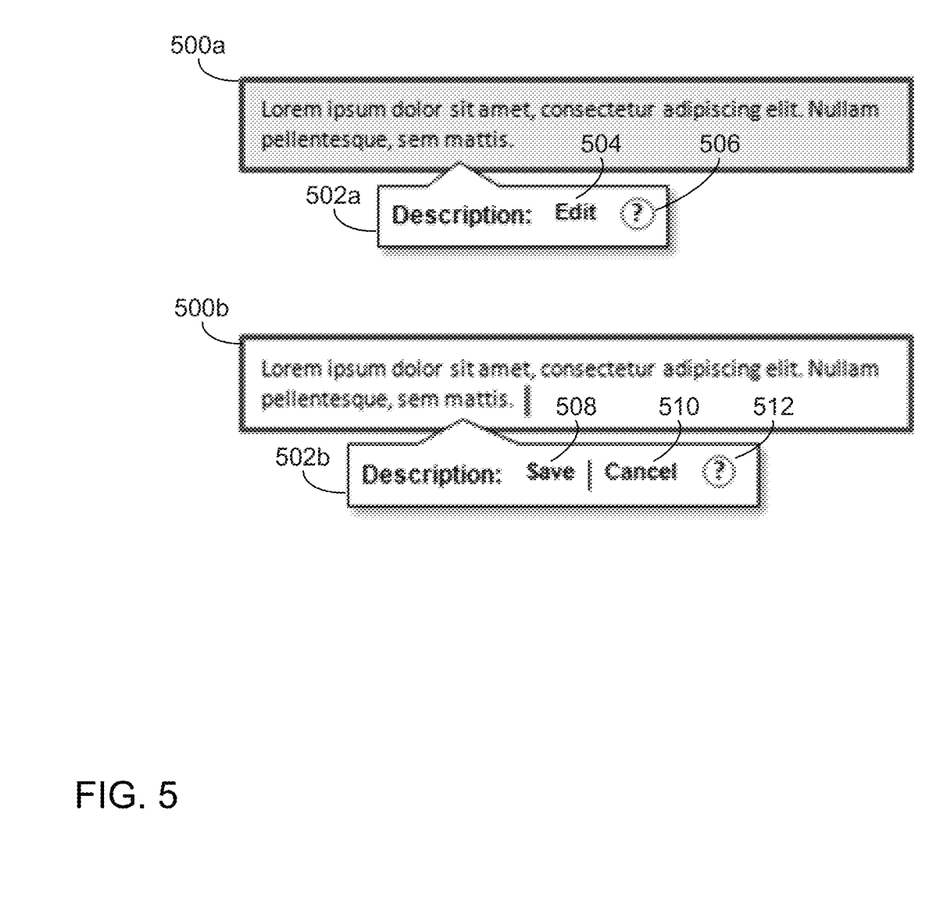
FIG. 5 is a diagrammatic view of an aspect of the in-line website editing process of FIG. 1.

Referring now also to FIG. 5, in certain embodiments that region 500*a* is an editable region may be indicated by dialog window 502. Dialog window 502 may include various action buttons (e.g., action buttons 504 and 506), which may facilitate various in-line editing functionality (e.g., a user entering edit mode with respect to region 500*a* or receiving various help information, respectively). In certain embodiments, for example, when a user selects button 504, region 500*a* may be made available for the entry of in-line edits (as indicated, for example by the changed background color of region 500*b* with respect to region 500*a*, and the cursor that is visible in region 500*b*). Upon entering a particular in-line edit in region 500*b*, a user may save the edit using button 508 (i.e., may commit the edit for rendering and/or otherwise cause IWE process 20 to update a created 222 draft to reflect the edit) and/or may cancel the changes the user has made by using button 510 (in which case the changes may not be committed for rendering and/or made part of a created 222 draft).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
identifying, by one or more computing devices, an editable region of a dynamically rendered webpage, wherein the editable region is available for selection by a user for entry of in-line edits, or wherein the editable region is available for entry of in-line edits by the user, or both;
providing, by the one or more computing devices, an indicator associated with the editable region, wherein the indicator identifies the editable region as available for editing source content of the dynamically rendered webpage, wherein the indicator includes one or more action buttons, wherein the one or more action buttons include one or more commands including at least one of submitting and discarding one or more changes to a content draft, wherein the one or more action buttons are not visible when a field included within the editable region is not being actively edited;
identifying, by the one or more computing devices, an in-line edit to the source content of the dynamically rendered webpage, made by a user, to a portion of the editable region wherein the in-line edit modifies the field;
creating the content draft in a content management system associated with the webpage, the content draft including the in-line edit made by the user;
identifying, by the one or more computing devices, commitment of the in-line edit for rendering;
identifying, by the one or more computing devices, in an edit mode of the dynamically rendered webpage, any errors associated with the modified field after identifying the commitment of the in-line edit for rendering, wherein the any errors would result in one of an incomplete and a failed rendering of the modified field;
providing, by the one or more computing devices, an indication of an error associated with the modified field to the user when the error associated with the modified field is identified;
rendering, by the one or more computing devices, a first portion of the webpage when no errors associated with the modified field are identified, wherein the rendering is based upon, at least in part, the commitment of the in-line edit for rendering, wherein the first portion of the webpage is affected by the in-line edit and one or more portions of the webpage that are not affected by the in-line edit are not rendered concurrently with the first portion of the webpage;
identifying a listening region of the dynamically rendered webpage, wherein the listening region is dependent on the editable region where the in-line edit is committed, and is associated with a second portion of the webpage that is not available for in-line editing;
identifying any errors associated with the listening region based upon, at least in part, the in-line edit to the portion of the editable region;
providing an indication of an error associated with the listening region when the error associated with the listening region is identified; and
rendering the second portion of the webpage when no errors associated with the listening region are identified based upon, at least in part, the commitment of the in-line edit for rendering of the first portion of the webpage.

2. The computer-implemented method of claim 1 wherein identifying the editable region is based upon, at least in part, identifying non-comment tags associated with the editable region.

3. The computer-implemented method of claim 1 wherein providing the indicator associated with the editable region is based upon, at least in part, the user viewing the webpage in the editing mode.

4. The computer-implemented method of claim 1 wherein the indicator associated with the editable region includes one or more of a field label, help text, and a control for editing the field included within the editable region.

5. The computer-implemented method of claim 1, wherein the in-line edit includes creation of new content associated with the editable region, the method further comprising:
wherein creating the content draft includes creating an edited content draft including the new content;
enabling in-line editing with respect to the edited content draft; and rendering a second portion of the webpage based upon, at least in part, a portion of the edited content draft and identifying the commitment of the in-line edit for rendering.

6. The computer-implemented method of claim 1, wherein the in-line edit includes an edit to existing content associated with the editable region, the method further comprising:
   wherein creating the content draft includes creating an edited content draft including the edit to existing content;
   enabling in-line editing with respect to the edited content draft; and
   rendering a second portion of the webpage based upon, at least in part, a portion of the edited content draft and identifying the commitment of the in-line edit for rendering.

7. A computer-implemented method comprising:
   identifying, by one or more computing devices, an editable region of a dynamically rendered webpage, wherein the editable region is available for selection by a user for entry of in-line edits, or wherein the editable region is available for entry of in-line edits by the user, or both;
   providing, by the one or more computing devices, an indicator associated with the editable region, wherein the indicator identifies the editable region as available for editing source content of the dynamically rendered webpage, wherein the indicator includes one or more action buttons, wherein the one or more action buttons include one or more commands including at least one of submitting and discarding one or more changes to a content draft, wherein the one or more action buttons are not visible when a field included within the editable region is not being actively edited;
   identifying, by the one or more computing devices, an in-line edit to the source content of the dynamically rendered webpage, made by a user, to a portion of the editable region wherein the in-line edit modifies the field;
   creating, by the one or more computing devices, an edited content draft including the in-line edit;
   creating the content draft in a content management system associated with the webpage, the content draft including the in-line edit made by the user;
   identifying, by the one or more computing devices, commitment of the in-line edit for rendering;
   identifying, by the one or more computing devices, in an edit mode of the dynamically rendered webpage, any errors associated with the modified field after identifying the commitment of the in-line edit for rendering, wherein the any errors would result in one of an incomplete and a failed rendering of the modified field;
   providing an indication of an error associated with the modified field to the user when the error associated with the modified field is identified;
   rendering, by the one or more computing devices, a first portion of the webpage associated with a portion of the edited content draft when no errors associated with the modified field are identified, wherein the rendering is based upon, at least in part, identifying the commitment of the in-line edit for rendering, wherein the first portion of the webpage is affected by the in-line edit and one or more portions of the webpage that are not affected by the in-line edit are not rendered concurrently with the first portion of the webpage;
   identifying, by the one or more computing devices, a listening region of the dynamically rendered webpage, wherein the listening region is associated with a second portion of the webpage and is dependent on the editable region;
   identifying, by the one or more computing devices, any errors associated with the listening region;
   providing, by the one or more computing devices, an indication of an error associated with the listening region when the error associated with the listening region is identified; and
   rendering, by the one or more computing devices, the second portion of the webpage when no errors associated with the listening region are identified based upon, at least in part, the commitment of the in-line edit for rendering.

* * * * *